United States Patent Office 3,472,349
Patented Oct. 14, 1969

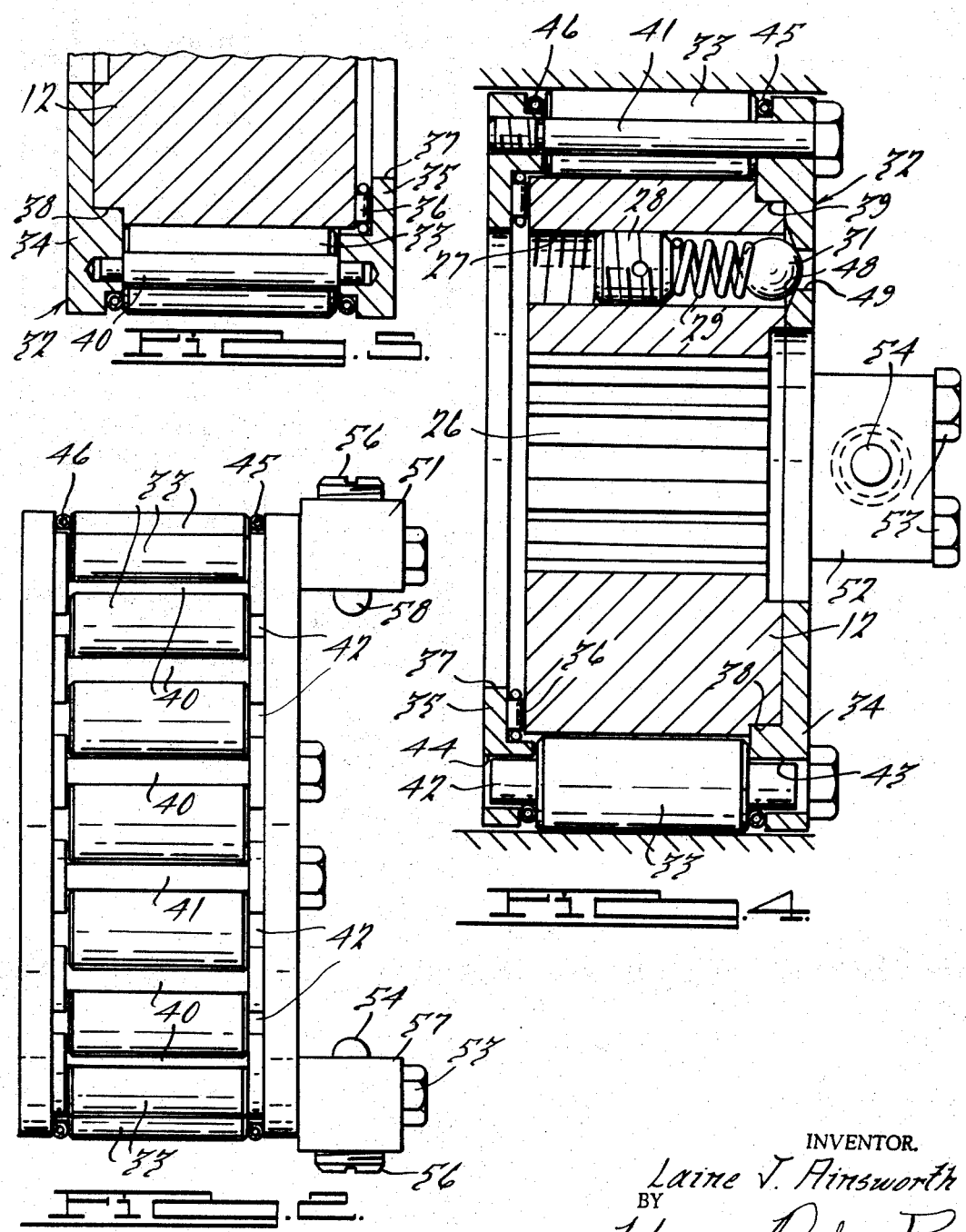

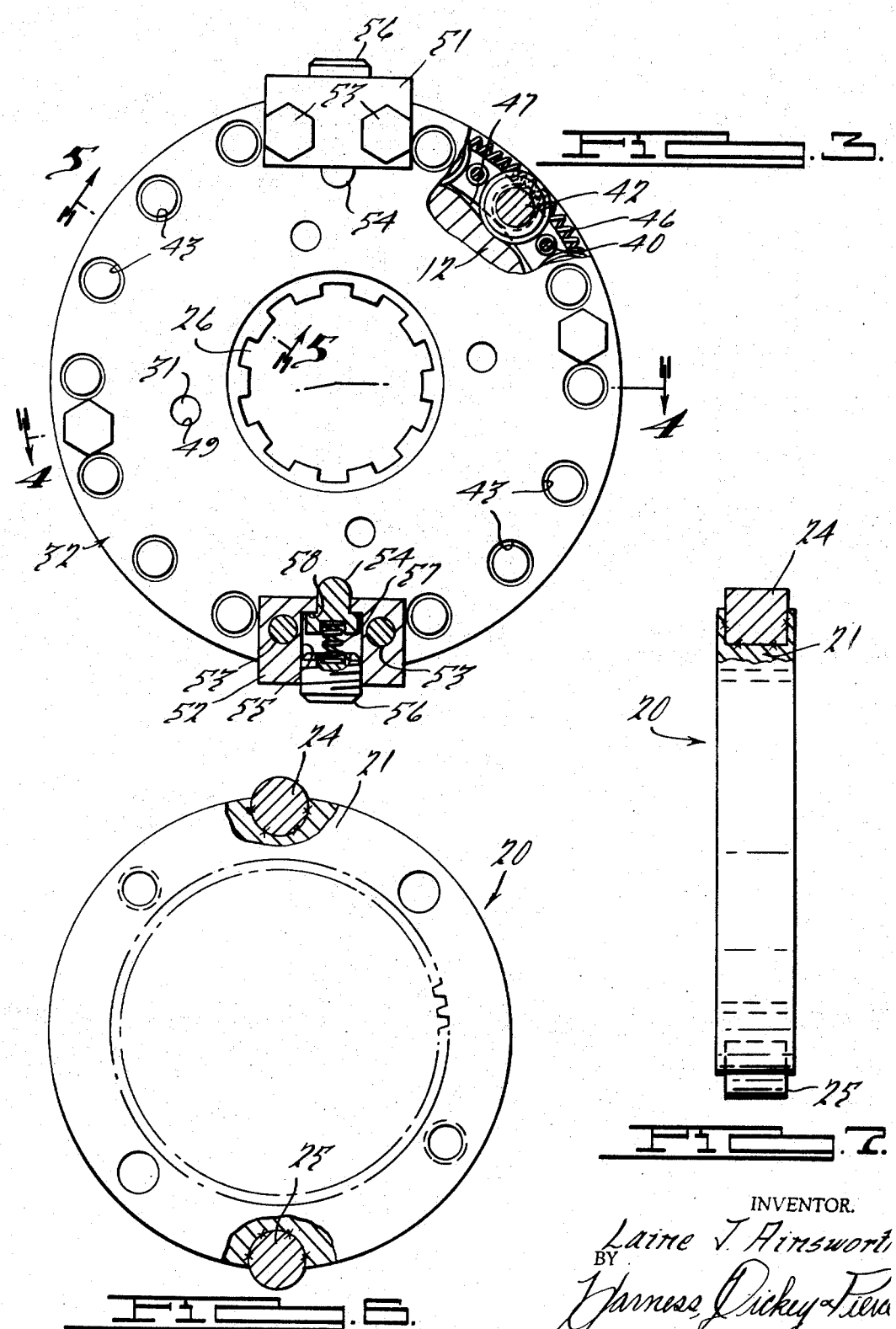

3,472,349
TWO-WAY OVERRUNNING CLUTCH
Laine J. Ainsworth, Oakland, Calif., assignor to Kelsey-Hayes Company, Romulus, Mich., a corporation of Delaware
Filed Nov. 25, 1968, Ser. No. 786,797
Int. Cl. F16d 41/00
U.S. Cl. 192—35                    7 Claims

ABSTRACT OF THE DISCLOSURE

A drive shaft and wheel hub are connected by a clutch having rollers on a cage, the rollers being forced against an outer race by a polygonal driving cam when a shaft to which the cam is attached tends to rotate faster than the wheel. The cage is normally held in a centered position with respect to the cam by yieldable detents, permitting retraction of the rollers from the outer race by garter springs. However, the cage is periodically retarded with respect to the cam by yieldable buttons which it carries and which strike retarding stationary abutments. Means are provided for adjusting the stiffness of both the detents and retarding buttons.

BACKGROUND OF THE INVENTION

Field of the invention

The invention relates to overrunning or freewheeling clutches which provide disengagement between inner and outer members when the inner member is rotating more slowly than the outer member in either direction.

Description of the prior art

It is known to provide overrunning clutches in which rollers on a cage are normally centered with respect to a polygonal inner cam which forces them against an outer race when rotation of the cage is resisted. However, the known prior art does not teach the novel centering means between the cage and polygonal cam, and the means for intermittently retarding rotation of the cage, which are found in this invention.

BRIEF SUMMARY OF THE INVENTION

Briefly, the invention comprises a polygonal cam surrounded by rollers, and a roller cage comprising a pair of plates on opposite sides of the cam, one of the plates having flared recesses which receive spring-pressed detents carried by the cam. These normally maintain the cage in centered position with respect to the cam, the rollers being urged inwardly against the central portions of the cam surfaces by garter springs. An outer race surrounds the rollers and is attached to a wheel hub.

A piar of spring-loaded buttons carried by the cage periodically engage abutments on a stationary ring, thus creating relative rotation between the cage, which is momentarily held stationary, and the cam which is fixed to the drive shaft. If the outer race is rotating faster than the cam, outward displacement of the rollers by the cam will be momentary, and as the buttons slide over the retarding abutments the detents will return the cage to its centered position. However, if the rotational speed of the shaft is greater than that of the outer race, the rollers will be wedged into position between the polygonal cam and the outer race and the shaft will drive the wheel hub at its own speed, until such time as the shaft slows down with respect to the wheel hub. At this time, the action of the buttons striking the retarding abutments will return the cage and rollers to their centered or freewheeling condition where they are held by the detents. Means are provided for adjusting the yieldability of the retarding buttons as well as the centering detents.

BRIEF DESCRIPTION OF THE DRAWINGS

FIGURE 2 is a side elevational view of the clutch, the outer race being omitted;

FIGURE 3 is an end elevational view of the clutch, parts being broken away for clarity;

FIGURE 4 is a cross-sectional view taken along the line 4—4 of FIGURE 3 and showing the roller mounting means as well as the detents;

FIGURE 5 is a fragmentary cross-sectional view taken along the line 5—5 of FIGURE 3 and showing a spacer between the side plates of the clutch;

FIGURE 6 is a side elevational view of the retarder ring assembly, and

FIGURE 7 is an end elevational view thereof, parts being sectioned.

DESCRIPTION OF THE PREFERRED EMBODIMENT

Figure 1:
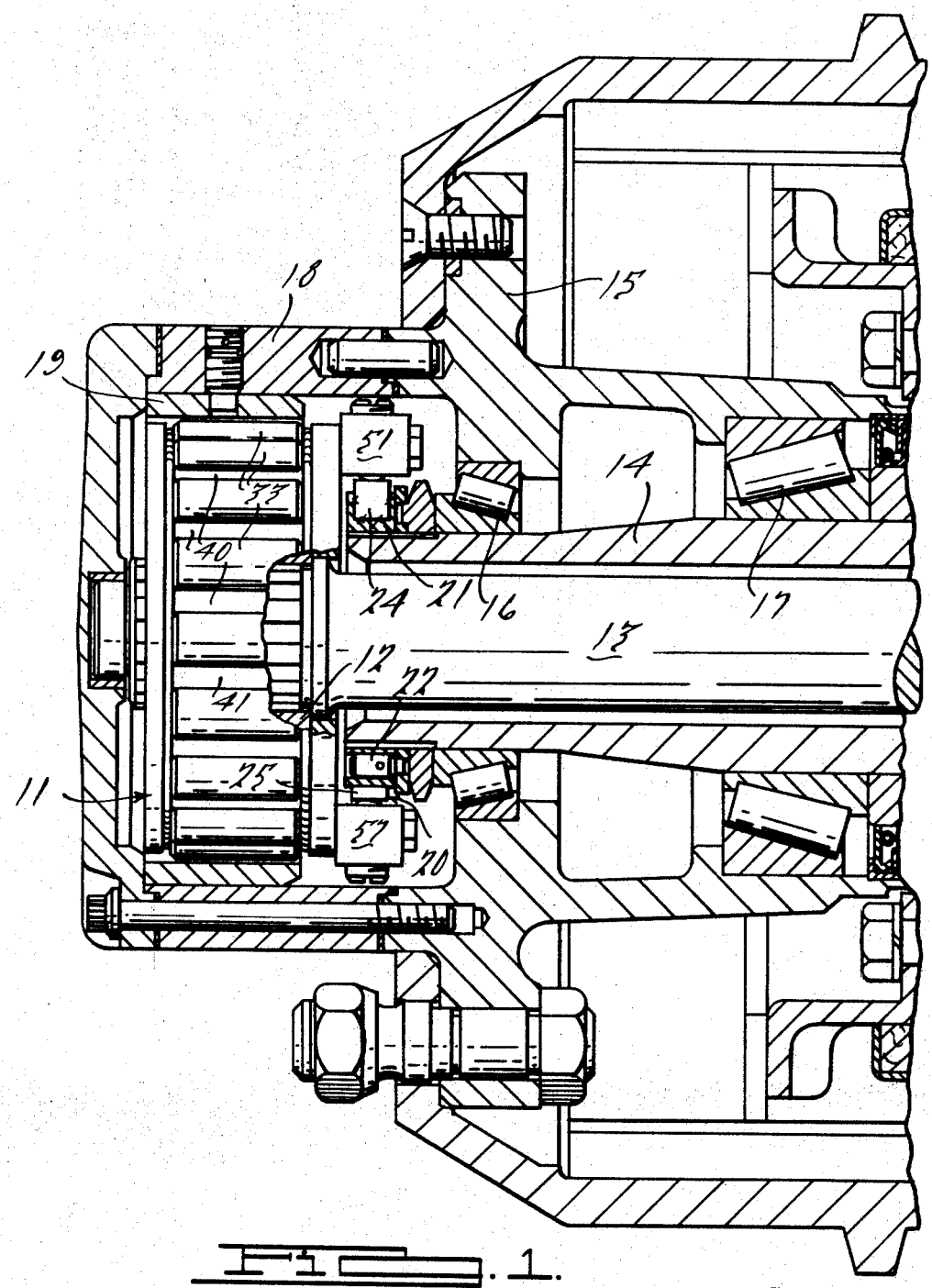
FIGURE 1 is a cross-sectional view in elevation of a portion of an axle assembly incorporating the novel clutch of this invention, part of the section being out of the plane of the main section for purpose of clarity.

The novel clutch assembly of this invention is generally indicated at 11, and its inner polygonal driving cam 12 is fixed to a drive shaft 13 mounted in a nonrotatable wheel spindle 14. A wheel hub 15, rotatably mounted on spindle 14 by bearings 16 and 17, carries an outer ring 18 within which is secured the outer race 19 of clutch 11.

Wheel spindle 14 also supports a stationary retarder assembly generally indicated at 20, the purpose of which is described below.

The construction of this retarder assembly is shown in FIGURES 5 and 6, the assembly comprising a ring 21 fixed to the wheel spindle by fasteners 22. Shaft 13 extends beyond the spindle and carries clutch assembly 11 in the space within ring 18, and retarder assembly ring 21 is adjacent this space and carries a pair of diametrically located retarding abutments 24 and 25. These are cylindrical members welded or otherwise secured into recesses in the outer surface of ring 22 so that they are only half exposed. The abutments are spaced inwardly of ring 18.

The construction of clutch assembly 11 as best seen in FIGURES 2 through 4. The assembly comprises inner polygonal driving cam 12, which has a splined central opening 26 receiving a complementary spline on shaft 13. Four axially extending threaded bores 27 are provided in the cam, these bores being equidistantly spaced around central opening 26. The bores carry adjustable plugs 28 each of which supports one end of a helical spring 29. The other end of the spring engages a ball detent 31 and urges it outwardly.

A cage generally indicated at 32 is provided for carrying a plurality of driving rollers 33. Cage 32 comprises a pair of circular plates 34 and 35 on opposite sides of driving cam 12. Thrust bearings 36 are provided between plate 35 and the adjacent side of cam 12, a clearance aperture 37 being provided in plate 35 inwardly of bearings 36. Plate 34 is rotatably mounted on cam 12 by interfitting shoulder 38 and 39 on the cam and plate respectively. Spacers 40 and bolts 41 extend between plates 34 and 35 and hold them in proper engagement with cam 12. Rollers 33 have narrower end portions 42 loosely disposed in bearing apertures 43 and 44 of plates 34 and 35, respectively, thus permitting radial movement of the rollers. A pair of garter springs 45 and 46 engage portions 42 of the rollers and urge them against cam 12. This cam is provided with a series of centrally notched flat surfaces 47 corresponding in number to rollers 33, and on which the rollers ride.

Plate 34 is provided with a plurality of circumferentially spaced flared recesses 48 connected at their narrower ends to apertures 49 and these receive detents 31 when the cage is in its centred position, thus tending to hold the cage in this position so that the rollers are at the centers of surfaces 47.

The means for periodically retarding cage 32 comprises a pair of button holders 51 and 52 which are secured on the outside of plate 34 at diametrically opposed locations. These button holders are secured to plate 34 by bolts 53 and carry buttons 54 which extend radially inwardly therefrom and are retractable, being mounted in bores 55 of holders 51 and 52. An adjustable screw 56 in each of said bores supports a helical spring 57 which urges button 54 inwardly toward the central axis of the assembly. This inward movement of the button is limited by shoulders 58 in holders 51 and 52.

The relative locations of the parts are such that upon rotation of the clutch assembly, buttons 54 will strike retarding abutments 24 and 25 each 180° of rotation. This striking action will cause momentary stoppage of cage 32 which is being rotated by the connection with cam 12 afforded by detents 31. However, since buttons 54 are yieldable, they will ride over abutments 24 and 25 permitting rotation of the cage to continue for another 180°.

In operation, with shaft 13 rotating more slowly than wheel hub 15, the outward camming action on rollers 33 caused by this repeated momentary halting of cage 32 will have no effect, since outer race 19 will simply ride past the outwardly cammed rollers. As buttons 54 are retracted, permitting the cage to continue its rotation for another 180°, detents 31 will return and hold the cage in its normal position in which it will be held by detents 31. This action will be repeated every 180° of rotation. The central notches in flat surfaces 47 of cam 12 will insure complete disengagement of rollers 33 from outer race 19.

Should drive shaft 13 increase its rotational speed relative to that of wheel hub 15 to the point where it tends to rotate faster than the wheel hub, the next retardation of cage 32 will not only cause outward camming of rollers 33 but will cause the rollers to be wedged into driving position against outer race 19, so that the clutch and wheel hub are rotated at the same speed and the clutch remains in engaged position. The repeated momentary engagements of buttons 54 and abutments 24 and 25 will continue, but will have no effect, detents 31 remaining out of their recesses 48. However, should the speed of the wheel hub increase relative to that of the drive shaft, momentary engagement of buttons 54 with retarding abutments 24 and 25 will cause rolers 33 to be dislodged from their engagement with outer race 19, and return the rollers to their centered position as described above. Should the rotation of drive shaft 13 cease completely, rollers 33 will simply remain in their centered position, withdrawn from the outer race.

The above described operation of the clutch assembly will be applicable to both directions of rotation.

It has been found that the novel retarding means and cage centering means of the invention provide not only a high degree of adjustability, but a positive and reliable means of accomplishing the cage retarding and centering actions in a clutch of this type.

What is claimed is:

1. In an overrunning clutch, a driving cam, an outer race, a plurality of rollers disposed between said cam and race, means for urging said rollers toward said cam, a cage supporting said rollers, yieldable means for maintaining said cage and driving cam in a centered rotational position relative to each other whereby said rollers will be retracted relative to said outer race, retarding means for said cage comprising at least one stationary member during rotation of said driving cam and said repeated engagement will cause momentary relative rotation between the cage and driving cam.

2. The combination according to claim 1, said retarding member comprising a fixed rounded surface, said striking member comprising a resiliently mounted button engageable with said rounded surface.

3. The combination according to claims 1 or 2, said yieldable means comprising at least one spring-pressed detent carried by said cam and receivable by a flared recess in said cage.

4. The combination according to claim 1, said cage comprising a pair of circular plates on opposite sides of said driving cam, axial bores in said driving cam, spring-urged detents in said bores, means for adjusting the spring-pressure exerted on said detents, and flared recesses in one plate of said cage receiving said detents.

5. The combination according to claims 1 or 2 said cage comprising a pair of flat circular plates on oppositie sides of said driving cam, and a holder secured to the outside of one of said plates and carrying said striking member, a spring in said holder urging said striking member toward its striking position, and means on said holder for adjusting the pressure of said spring.

6. The combination according to claim 1, said retarding mans further comprising a ring, there being two retarding members fixedly and diametrically mounted on said ring, said cage comprising a pair of flat circular plates on opposite sides of said driving cam, a pair of holders diametrically mounted on the outside of one of said plates, said striking members comprising buttons mounted in said holders and spring-urged toward said retarding members, and means for adjusting the degree of spring-urging of said striking members.

7. The combination according to claim 6, said yieldable means for centering the cage with respect to the driving cam comprising a plurality of circumferentially spaced detents mounted in said driving cam and spring-urged by adjustable means in an axial direction, and flared recesses in one of said cage plates receiving said detents.

References Cited

UNITED STATES PATENTS

| 3,055,471 | 9/1962 | Warn et al. | 192—36 XR |
| 3,300,002 | 1/1967 | Roper | 192—38 XR |

CARLTON R. CROYLE, Primary Examiner

A. D. HERRMANN, Assistant Examiner

U.S. Cl. X.R.

192—45, 50

PO-1050
(5/69)

UNITED STATES PATENT OFFICE
CERTIFICATE OF CORRECTION

Patent No. 3,472,349           Dated October 14, 1969

Inventor(s) Laine J. Ainsworth

It is certified that error appears in the above-identified patent and that said Letters Patent are hereby corrected as shown below:

Column 1, line 54, delete "piar" and substitute therefor --pair--
Column 3, line 34, after "normal" insert --centered--
Column 3, line 54, delete "rolers" and substitute therefor --rollers--
Claim 1, line 12, delete "ary" and substitute therefor --retarding--
Claim 1, line 12, after "member" insert --and a striking member carried by said cage and repeatedly engageable with said stationary member--
Claim 1, line 12, after "and" insert --cage, one of said members being yieldable whereby--
Claim 4, line 24, after "of" insert --flat--
Claim 5, line 31, delete "oppositie" and substitute therefor --opposite--
Claim 6, line 37, delete "mans" and substitute therefor --means--

SIGNED AND
SEALED
MAY 19 1970

(SEAL)
Attest:

Edward M. Fletcher, Jr.
Attesting Officer

WILLIAM E. SCHUYLER, JR.
Commissioner of Patents